United States Patent [19]
Butler

[11] Patent Number: 5,951,030
[45] Date of Patent: Sep. 14, 1999

[54] SPINDLE LENGTH EXTENDER FOR DOUBLE WISHBONE SUSPENSION SYSTEMS OF MOTOR VEHICLES

[76] Inventor: Boyd L. Butler, 1672 E. 10770 South, Sandy, Utah 84092

[21] Appl. No.: 08/915,524

[22] Filed: Aug. 15, 1997

[51] Int. Cl.⁶ .................................................. B62D 17/00
[52] U.S. Cl. ..................................... 280/86.751; 29/401.1
[58] Field of Search ......................... 280/86.751, 86.756, 280/86.753, 86.75, 93.511, 93.512; 403/3, 4, 337; 29/401.1, 402.3, 426.4

[56] References Cited

U.S. PATENT DOCUMENTS

| | | | |
|---|---|---|---|
| 2,684,253 | 7/1954 | Leighton | 280/86.751 |
| 4,580,807 | 4/1986 | Cox et al. | 280/86.751 |
| 5,094,472 | 3/1992 | Oyama et al. | 280/86.751 |
| 5,503,418 | 4/1996 | Schmidt et al. | 280/93.511 |

*Primary Examiner*—Paul N. Dickson
*Attorney, Agent, or Firm*—Mallinckrodt & Mallinckrodt

[57] ABSTRACT

A bolt-on apparatus for conveniently modifying the camber curves of double wishbone suspensions on motor vehicles, for increased cornering performance includes an adaptive spacer to increase the distance between the upper and lower ball joint pivots of the wishbone control arms. The increased distance between the ball joint pivots changes the camber curve and reverses the position of the instant center point, about which the tires laterally pivot, or lean, at any given instant. This allows the tires to lean in the proper direction to maintain contact with the surface of the road while the vehicle frame rolls toward the outside of the turn resulting in improved tire wear and cornering traction.

11 Claims, 5 Drawing Sheets

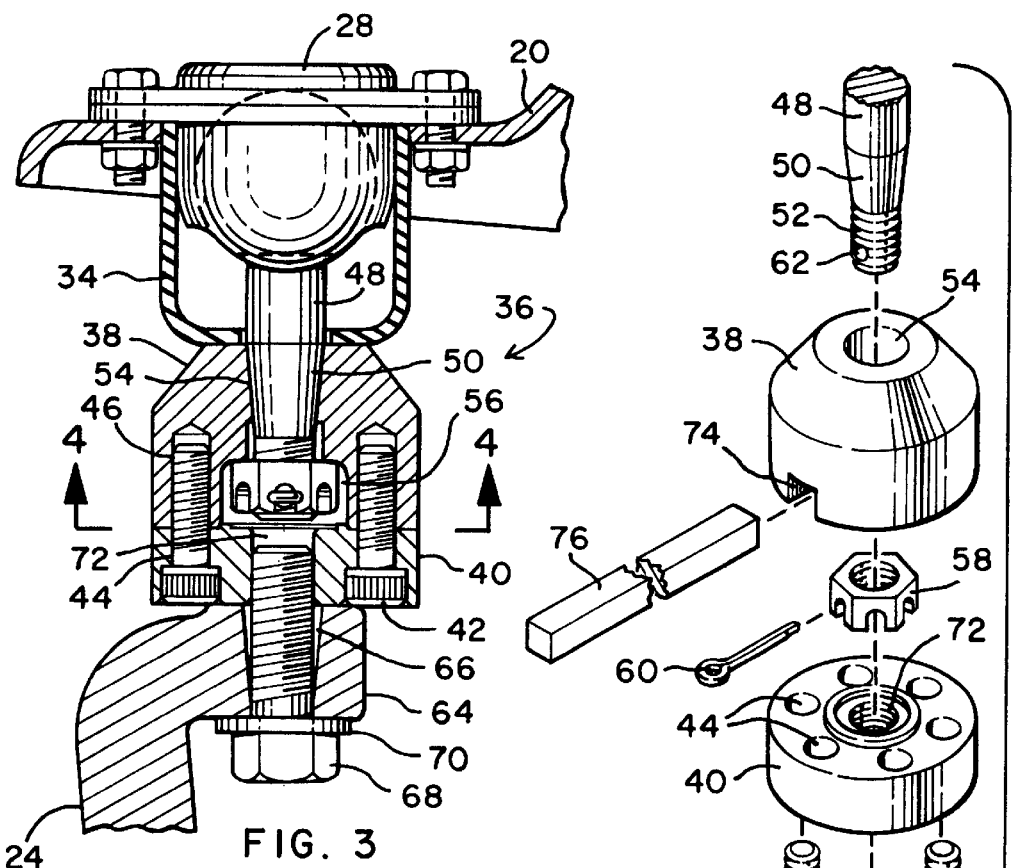
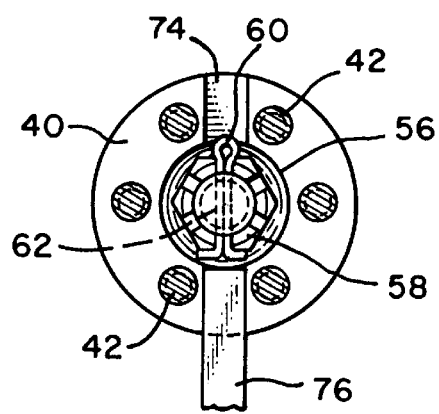
FIG. 3
FIG. 4
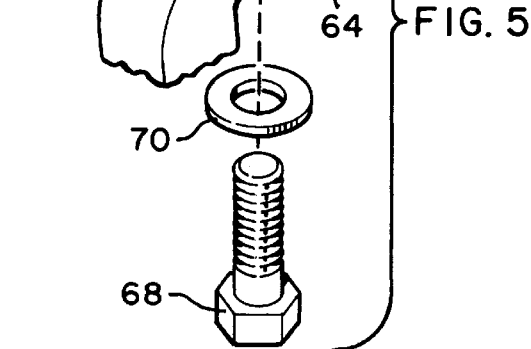
FIG. 5

SPINDLE LENGTH EXTENDER FOR DOUBLE WISHBONE SUSPENSION SYSTEMS OF MOTOR VEHICLES

BACKGROUND OF THE INVENTION

1. Field

The invention is in the field of apparatuses and methods for modifying suspension systems used on motor vehicles, and in particular directed to those which are used to modify double wishbone suspension systems, wherein the angular relationships of the suspension system control arms are modified so as to change vehicle handling characteristics.

2. State of the Art

The handling characteristics of motor vehicles, such as automobiles, are largely determined by the vehicle's suspension system, particularly the front suspension system. The purpose of the suspension system is to provide the vehicle driver and passengers with a smooth ride while at the same time providing the driver with adequate control over the vehicle, particularly when accelerating, braking, cornering, and when riding over an uneven road surface. The design of the suspension systems, as received from the factory, are therefore necessarily a compromise between performance, handling, smooth ride, and safety, with the emphasis on safety.

A double wishbone suspension system is a type of suspension system commonly used on automobiles. A key parameter in the design of such a suspension system, particularly with regard to safety and handling, is the camber curve. On double wishbone suspension systems, the upper and lower control arms form a four-bar linkage with the vehicle frame and with the respective spindles upon which each wheel and tire rotate. A coil spring spanning between each lower control arm and the vehicle frame transfers the vehicle weight to respective wheels and tires while allowing the respective control arm ends, spindles, wheels, and tires to move up and down in response to vehicle acceleration, braking, turning, and road conditions, in an arcuate path. This path, as viewed from the front or the rear of the vehicle, is the camber curve. The camber curve is defined by the specific geometry of the vehicle frame, control arms, and spindle, which comprise the four-bar linkage. At any given vertical position of the spindle, wheel, and tire relative to the vehicle frame, the center of the camber arc is located at a specific instantaneous center point, or I.C.P., which point moves as the suspension system moves through the camber curve.

The typical double wishbone motor vehicle suspension system as designed and built by the manufacturer has camber curves which curve away from the vehicle when the suspension is moved up or down from the static position, and, therefore, has instantaneous center points which are on the side away from the vehicle. Thus, when the vehicle turns, the tire tread does not remain perpendicular to the road, but rather the tires ride on their edges due to the rolling action of the vehicle caused by weight shifting away from the direction of turning. Both tires are loaded on the shoulder facing away from the direction of the turn, with the outside tire being particularly heavily loaded. The shoulders facing the direction of the turn are lightly loaded, or not loaded at all, and in some cases the entire inside tire can lift off the surface of the road. The sidewall of the outside tire may even touch the highway surface in a severe turn. The result is excessive tire wear, particularly to the front tires, on the outside tire tread and shoulder, along with poor lateral cornering traction and poor vehicle cornering performance.

Also, even when the vehicle is not turning, when a tire hits a bump and moves upward, the tire rides on its outer edge, and when the tire hits a dip and moves downward, the tire rides on its inside edge.

The reason automobile manufacturers design suspension systems such as the dual wishbone suspension systems of their rear wheel drive automobiles with outwardly curving camber curves is to build understeer into the vehicles to prevent oversteer. Understeer occurs in a hard turn, when the front tires lose lateral traction before the rear tires do, causing the vehicle to turn less or track in a straighter path than the actual steering position of the wheels. Oversteer is the opposite, wherein the rear tires slide laterally first, causing the vehicle to turn faster than the steering position of the front wheels. Understeer has been designed into most automobiles to prevent the occurrence of trailing throttle oversteer. Trailing throttle oversteer occurs when the vehicle driver reduces the throttle position in a turn, transferring weight to the front tires by adding a braking component to the rear tires from compression braking from the engine. This can induce oversteer by reducing traction of the rear tires.

Some designs in use today incorporate such an extreme understeering suspension design that the lack of turning ability may be as unsafe as oversteer. Some vehicle owners have attempted to revise the design of the suspension system to a more neutral geometry so as to reduce wear of the front tires and to balance the handling characteristics to a more desirable balance between understeer and oversteer. This has typically been attempted by reworking the vehicle frame to move the pivot points of the control arms on the frame, or by manufacturing special spindles having greater height to further space the pivot points of the control arms adjacent the wheels. While these changes alter the camber curves in a favorable manner, such changes require either extensive modification of the frame (not possible in some cases) or manufacture of costly new taller spindles. Neither of these may be economical nor within the means of most owners of motor vehicles in need of modification.

SUMMARY OF THE INVENTION

The invention provides a spacer apparatus and a method of using the spacer apparatus to modify the camber curves of double wishbone suspension systems used on motor vehicles to improve handling and reduce vehicle tire wear. Unlike prior art suspension system modifications which require complete suspension system spindle replacement or extensive vehicle frame modifications, the spacer apparatus and method of the present invention increase the effective length of the standard spindles and use the standard suspension system components. The spacer apparatus attaches between the end of a spindle and the ball joint to increase the spacing between the control arm pivot point adjacent the spindle and thus favorably modify the suspension system camber curve. The spacer apparatus preferably comprises upper and lower halves which securely bolt together. The lower spacer half preferably bolts to the upper end of the standard production spindle and the upper spacer half preferably mates with the tapered shaft of the standard production upper ball joint. The use of two halves which bolt together allows each half to be adapted to attach to the respective standard suspension system component, and subsequently the spacer halves to be attached to each other. With the two halves connected, a strong mechanical connection is made such that the standard spindle and the spacer apparatus form an integral unit providing increased spacing between the upper and lower ball joint pivots as a specially made elongated spindle would do, but at a fraction of the cost. Installation is accomplished easily using a lift and standard hand tools. Furthermore, the spacer apparatus can be made to adapt to virtually any wishbone suspension system and the method is easily and completely reversible should it be desired to return the vehicle to its original condition. Further, spacer apparatus of different sizes can be made so that a user can select an apparatus to provide a desired camber curve.

THE DRAWINGS

The best mode presently contemplated for carrying out the invention is illustrated in the accompanying drawings, in which:

FIG. 1 is a fragmentary vertical section of half of an unmodified double wishbone suspension system showing the system as supplied by the vehicle manufacturer;

FIG. 2, a view similar to that of FIG. 1 but showing the addition of the spindle length extender of the invention;

FIG. 3, an enlarged fragmentary vertical-section of the spindle length extender of the invention installed in a suspension system as shown in FIG. 2;

FIG. 4, a transverse section along the 4—4 of FIG. 3;

FIG. 5, an exploded perspective view of the spindle length extender;

FIG. 6, a front schematic diagram of half of an unmodified, standard wishbone suspension system in various operational positions and showing the camber curve;

FIG. 7, a front schematic diagram similar to FIG. 6 but showing a modified wishbone suspension system in various operational positions;

FIG. 8, a front schematic diagram of an unmodified standard wishbone suspension in a static state;

FIG. 9, a front schematic diagram of an unmodified standard wishbone suspension during a right turn;

FIG. 10, a front schematic diagram of a modified wishbone suspension system in a static state;

FIG. 11, a front schematic diagram of a modified wishbone suspension system during a right turn; and FIG. 12, a view similiar to that of FIG. 2 but showing the spindle length extender of the invention mounted between the lower end of the spindle and the lower ball joint.

DETAILED DESCRIPTION OF THE ILLUSTRATED EMBODIMENTS

Figure 1:
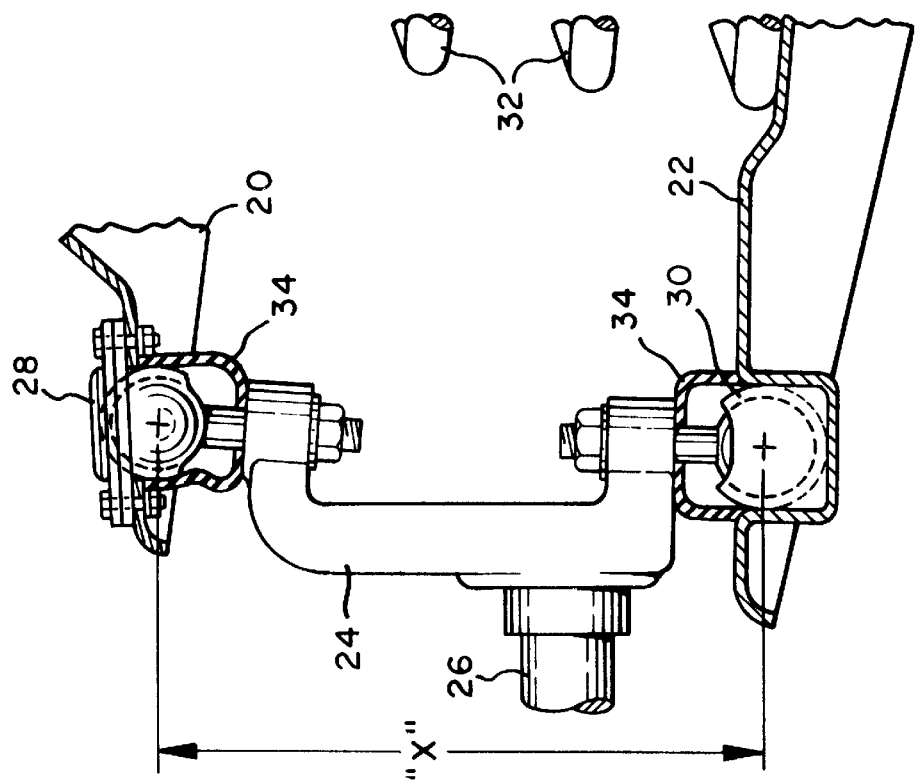

FIG. 1 shows a typical wishbone suspension system on a vehicle as supplied by the manufacturer. It consists of an upper wishbone control arm 20 and a lower wishbone control arm 22, both of which are pivotally connected to a vehicle frame (not shown). A spindle 24, which has a wheel axle 26 for supporting a wheel with tire mounted thereon(not shown), is pivotally attached to each of control arms 20 and 22 through an upper ball joint 28 and a lower ball joint 30, respectively. A spring 32 resiliently supports the lower control arm 22 with respect to the vehicle frame. Control arms 20 and 22, spindle 24, and the vehicle frame comprise a four bar linkage which, along with spring 32, support the vehicle weight on the tires. Ball joints 28 and 30 allow control arms 20 and 22 to move vertically while simultaneously allowing spindle 24 to pivot horizontally through a full range of motion. Upper ball joint 28 and lower ball joint 30 are typically protected from water and dirt by covering with rubber boots 34. Ball joints 28 and 30 are spaced apart by spindle 24 a distance "X".

Figure 2:
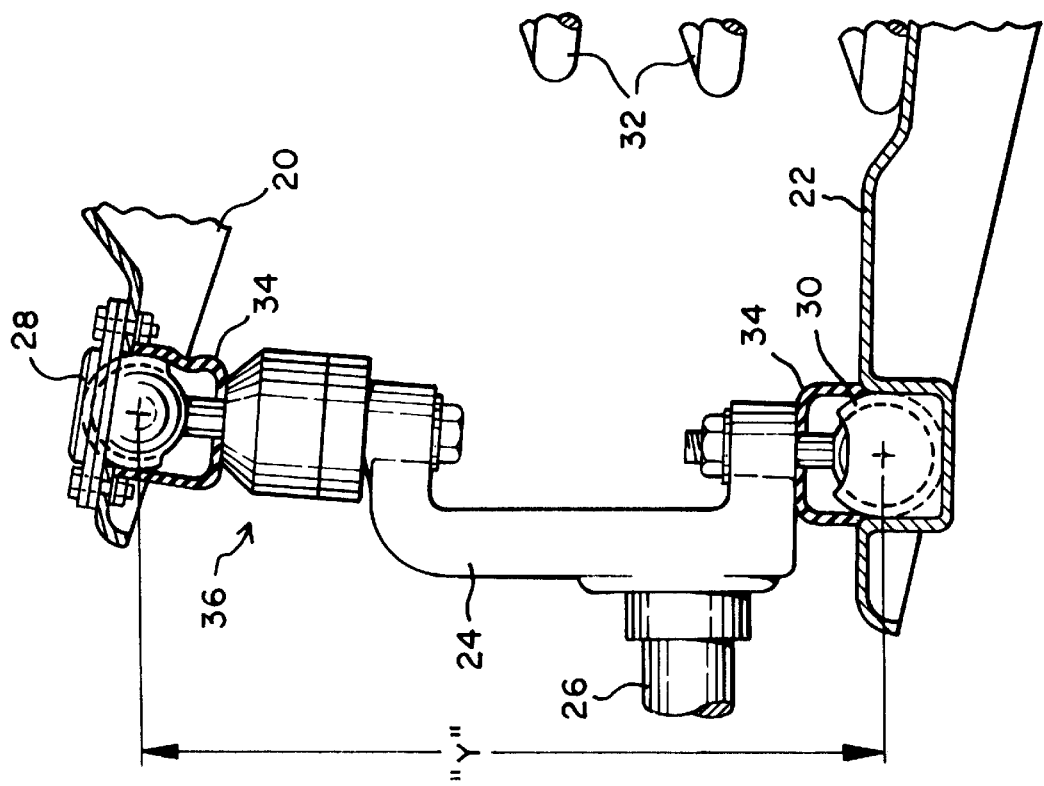

FIG. 2 shows the wishbone suspension of FIG. 1, wherein a spindle length extender 36 has been added between spindle 24 and upper ball joint 28. This increases the spacing between ball joints 28 and 30 to a new distance "Y", which distance is greater than distance "X" of the unmodified suspension of FIG. 1. The effect of this modification is to change the angle of upper wishbone control arm 20, which in turn changes the action of the four bar link mechanism formed by control arms 20 and 22, spindle 24, and the vehicle frame, as shown in FIGS. 6–11. The construction of spindle length extender 36 is shown in FIGS. 3, 4, and 5. It comprises two main parts, top extender 38 and bottom extender 40, which are held together by means such as a plurality of circumferentially spaced bolts 42, which extend through countersunk clearance apertures 44 in bottom extender 40, and are threaded into threaded apertures 46 in top extender 38. Bolts 42 are countersunk into bottom extender 40 so as to clear spindle 24. This bolted together construction is a key feature which allows spindle extender 38 to be used without having to replace upper ball joint 28 with a specially made ball joint having a non-standard, longer stem.

Top extender 38 is connected to ball joint 28, which typically has a stem or stud 48 with a tapered portion 50 and a threaded end 52. Top extender 38 has a matching tapered aperture 54 which mates with tapered portion 50 when stem 48 is inserted therein. Tapered aperture 54 has a countersunk portion 56 to accommodate a castle nut 58 threaded onto threaded end 52 so as to allow enough room to tighten castle nut 58 with a standard socket wrench (not shown). A cotter pin 60 is inserted into a cotter pin aperture 62 in threaded end 52 and the ends bent so as to secure castle nut 58 to stem 48. A tightening handle slot 74 in top extender 38 is provided so that a tightening handle 76 can be inserted therein to restrain top extender 38 from rotating while tightening castle nut 58.

With top extender 38 secured to ball joint stem 48, bottom extender 40 is secured to top extender 38 with bolts 42. Attachment of the two halves at this point allows insertion and tightening of bolts 42 without interference from spindle 24. Tightening handle 76 can be used to hold extender 36 from rotating while bolts 42 are tightened.

Spindle 24 has an upper mounting end 64 with a tapered aperture 66 which prior to modification mated with tapered portion 50 of ball joint stem 48. Spindle mounting end 64 is secured to bottom extender 40 by means such as a main bolt 68 and hardened washer 70, main bolt 68 extending through aperture 66 and being threaded into threaded aperture 72 in bottom extender 40. Tightening handle 76 is again used to prevent extender 36 from rotating while tightening main bolt 68. While slot 74 and handle 76 have been found effective and easy to use to prevent rotation of extender 36, various other ways of preventing rotation such as providing flats on opposite sides of extender 36 so it can be held with a wrench, could be used.

Figure 6:
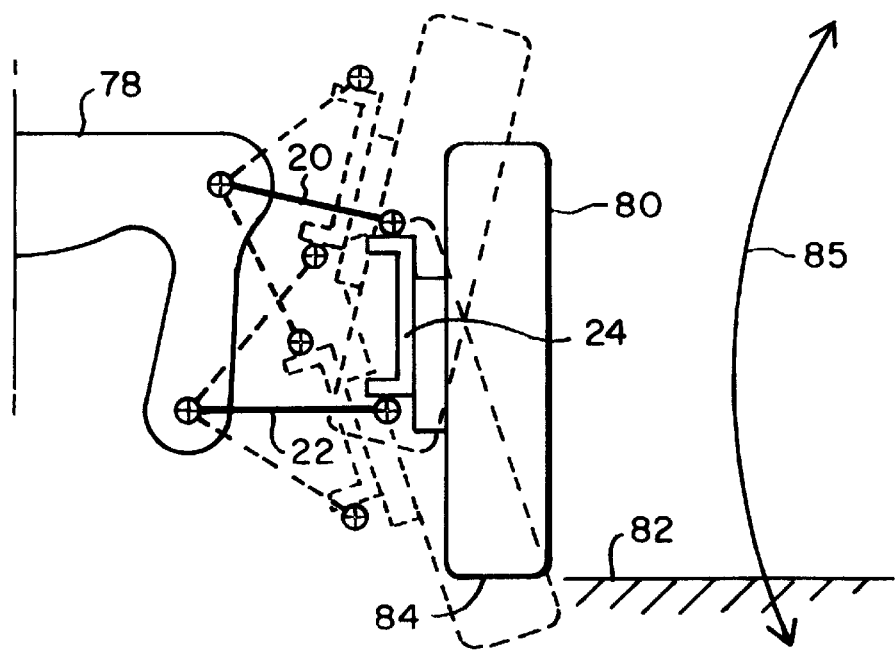

FIG. 6 is a schematic of half of a standard wishbone suspension system, as viewed from the front, showing a portion of a vehicle frame 78, upper control arm 20, lower control arm 22, spindle 24, and a tire 80 mounted on the axle (not shown) extending from spindle 24. The solid outline shows the suspension system in the neutral static state, such as when driving straight on a flat road, or when parked. The tire 80 is perpendicular to the road surface 82 with the outer circumferential surface, or tread 84, thereof parallel to road surface 82. The upper dotted line position of tire 80 (exaggerated for clarity), occurs when the tire is on the outer side of the vehicle in a turn, when the vehicle veers right or left, or when a bump is hit by tire 80. The suspension system tilts tire 80 off of perpendicular with road surface 82, such that tread 84 is no longer parallel with road surface 82. This results in lost traction and irregular tire wear. The opposite occurs when tire 80 moves downward past the static ride height position, as illustrated by the longer dashed lines. This condition occurs after a tire experiences jounce and then rebounds past the static ride position. Rebound also occurs when the tire encounters a dip or pot hole in the road surface, and to the inside tire when the vehicle veers right or left. In rebound, tire 80 moves past the perpendicular position to a position where the tread 84 is not parallel to the road surface 82. This results in lost traction and irregular tire wear.

At any given instant, in any position, spindle 24 of the suspension, and likewise tire 80, move about a point called the instantaneous center point, or I.C.P. The movement generates a camber arc or curve, the direction of curvature of the camber curve being shown approximately by arc 85. The camber curve 85 indicates the angle of the tire 80 in jounce and rebound, relative to the vehicle frame 78 and to the road surface 82. In all of the positions illustrated in FIG. 6, the I.C.P. and camber curve are directed toward the right side of the page, or away from the vehicle. This is how most rear wheel drive automobiles are designed, so as to make the vehicle understeer, as explained previously.

Figure 7:
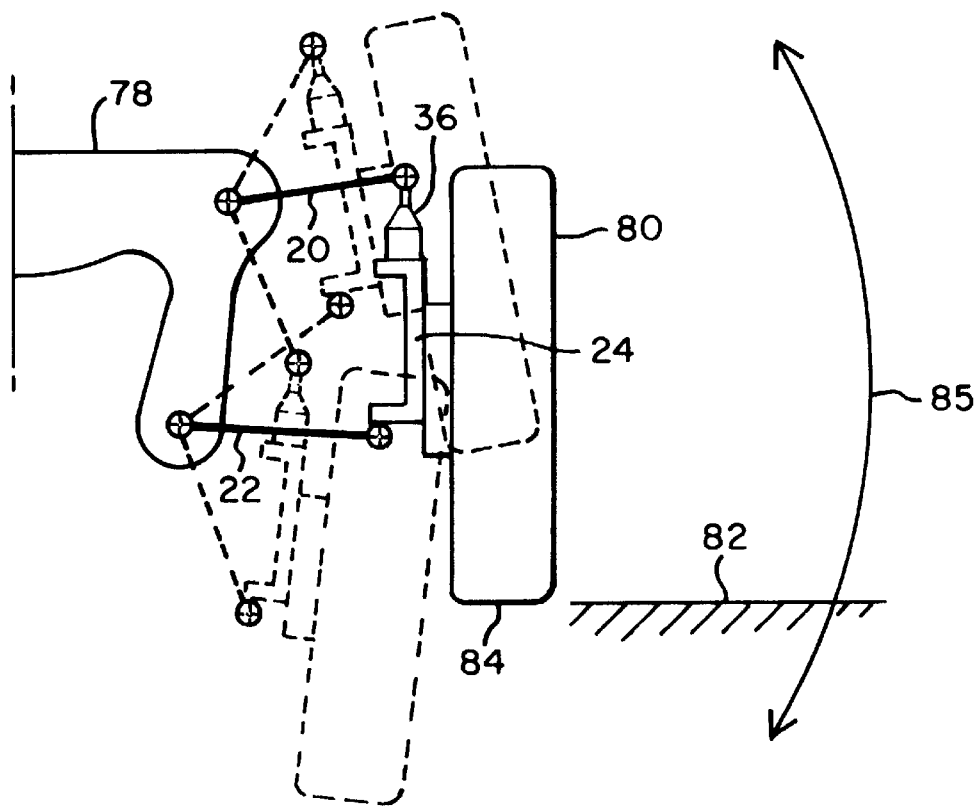

FIG. 7 illustrates the same half of a wishbone suspension as in FIG. 6, except for the addition of spindle extender 36, which is positioned as in FIG. 2, to space upper ball joint 28 further away from lower ball joint 30. In this configuration, the angular relationship between the wishbone control arms is reversed. The control arms will be diverging in angle from frame to spindle and the I.C.P. is to the left of FIG. 7. The camber curve is now completely reversed and curves toward the left side of the page, or toward the vehicle. Now, when the suspension is compressed and moves upward in jounce, tire 80 leans slightly to the vehicle side, opposite that of FIG. 6. Likewise, in rebound, tire 80 leans slightly away from the vehicle, opposite that of FIG. 6. The significance of this reversal in how the vehicle handles is shown in the FIGS. 8 through 11 which follow.

Figure 8:
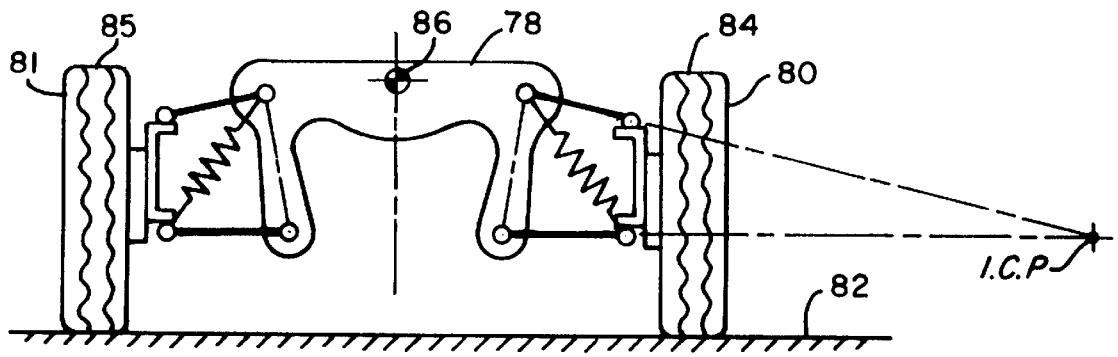

FIG. 8 is a schematic of the standard wishbone suspension shown in FIG. 6, but showing both sides of the wishbone suspension. The vehicle frame 78 is shown in a static position, such as when driving straight down a smooth road at a constant speed. Vehicle frame 78 is level with road surface 82, with both of tires 80 and 81 perpendicular to road surface 82 and tire treads 84 and 85 parallel thereto. This condition, wherein the vehicle frame 78 is level to road surface 82 with tire treads 84 and 85 parallel to and in full contact with road surface 82, produces the greatest amount of frictional engagement therebetween so as to provide the best vehicle handling. The vehicle center of mass 86 does not apply any lateral forces in this condition since no lateral acceleration is present. In a dynamic situation, such as a hard right turn where there is lateral acceleration, as depicted in FIG. 9, the same cannot be said.

Figure 9:
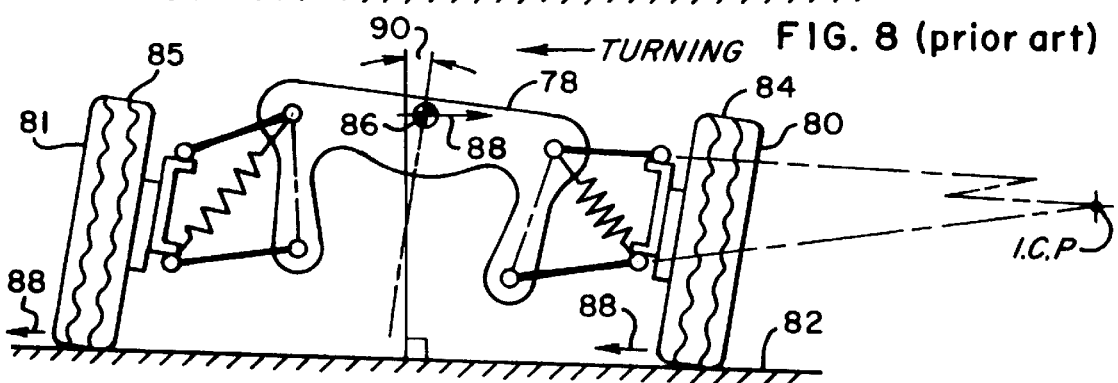

In such a right hand turn as in FIG. 9, lateral forces come into play. Couple forces 88 are generated wherein tires 80 and 81 exert a force on frame 78, pulling the same toward the right while the mass of vehicle frame 78, acting through vehicle center of mass 86, resists such turning, as by centrifugal force. Vehicle frame 78 is tilted from parallel to the road surface 82 as through a tilt angle 90. These forces, acting on the wishbone suspension, cause left tire 84 to go into jounce and right tire 81 to go into rebound. The suspension system pivots about an I.C.P. such as "C" which causes tires 80 and 81 to tilt off of perpendicular with road surface 82, with the resulting loss in friction, or traction, therebetween. Tire 80, which carries more of the lateral forces than tire 81, can actually, in some circumstances, partially ride on the tire sidewall (not shown) which causes premature tire wear out and possible tire failure or even lift completely off of the road surface 82.

Figure 10:
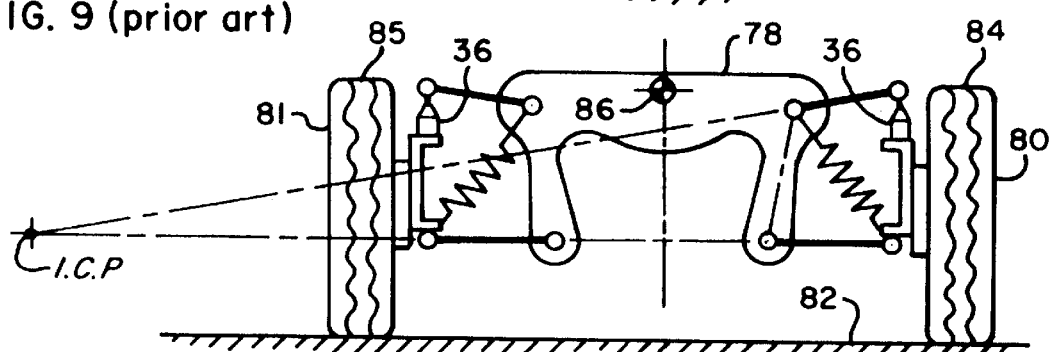

In FIG. 10 is shown the wishbone suspension of FIGS. 8 and 9 as modified, with spindle extender 36 spacing apart the upper and lower ball joints, and in the static state. In this modified configuration, the I.C.P. is changed from the vehicle left side, or away from the vehicle, to the right side of the vehicle, or toward the vehicle, as at point "D". This change in location of the I.C.P. from "C" to "D" causes tire 80 to tilt as in FIG. 7, or opposite that of FIGS. 6, 8, and 9, with a corresponding change in tilt of tire 81. The effect of this change is depicted in FIG. 11.

Figure 11:
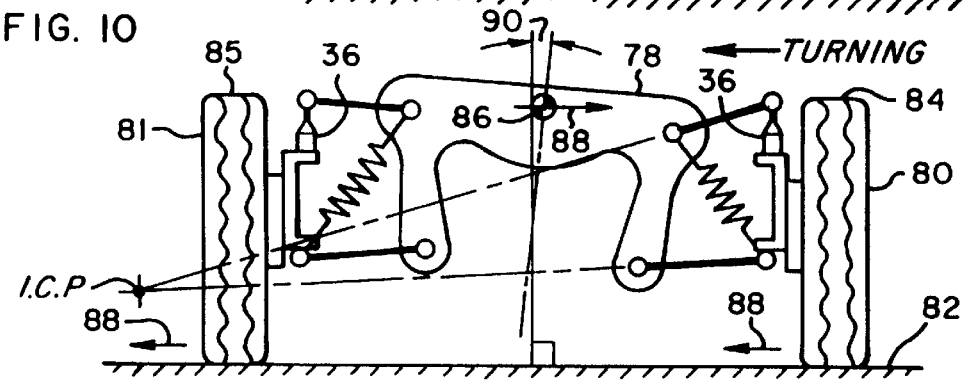

FIG. 11 shows the modified suspension system of FIG. 9 in the same dynamic turning situation as the unmodified suspension system was in FIG. 9. The vehicle frame 78 is tilted from parallel with road surface 82 at approximately the same angle 90 as in FIG. 9, due to the same couple forces 88. The wishbone suspension again reacts by putting the outside tire 80 into jounce, and the inside tire 81 into rebound. The position of each of tires 80 and 81, however, relative to the road surface 82 is quite different from the unmodified suspension of FIGS. 8 and 9. While the vehicle frame tilts or rolls at an angle 90 from road surface 82, each of tires 80 and 81 remain essentially perpendicular to road surface 82, with the respective tire treads 84 and 85 remaining essentially in full contact with road surface 82 to maximize the friction therebetween for enhanced suspension system and vehicle cornering performance. This occurs because the outside tire 80, in jounce, tilts toward the vehicle while the inside tire 81, in rebound, tilts away from the vehicle, rather than the reverse, which occurs in the unmodified suspension system. This tilting of the tires in the proper direction relative to the vehicle frame 78 is key to maintaining the tire treads 84 and 85 in full contact with road surface 82 resulting in improved tire traction and vehicle handling.

Figure 12:
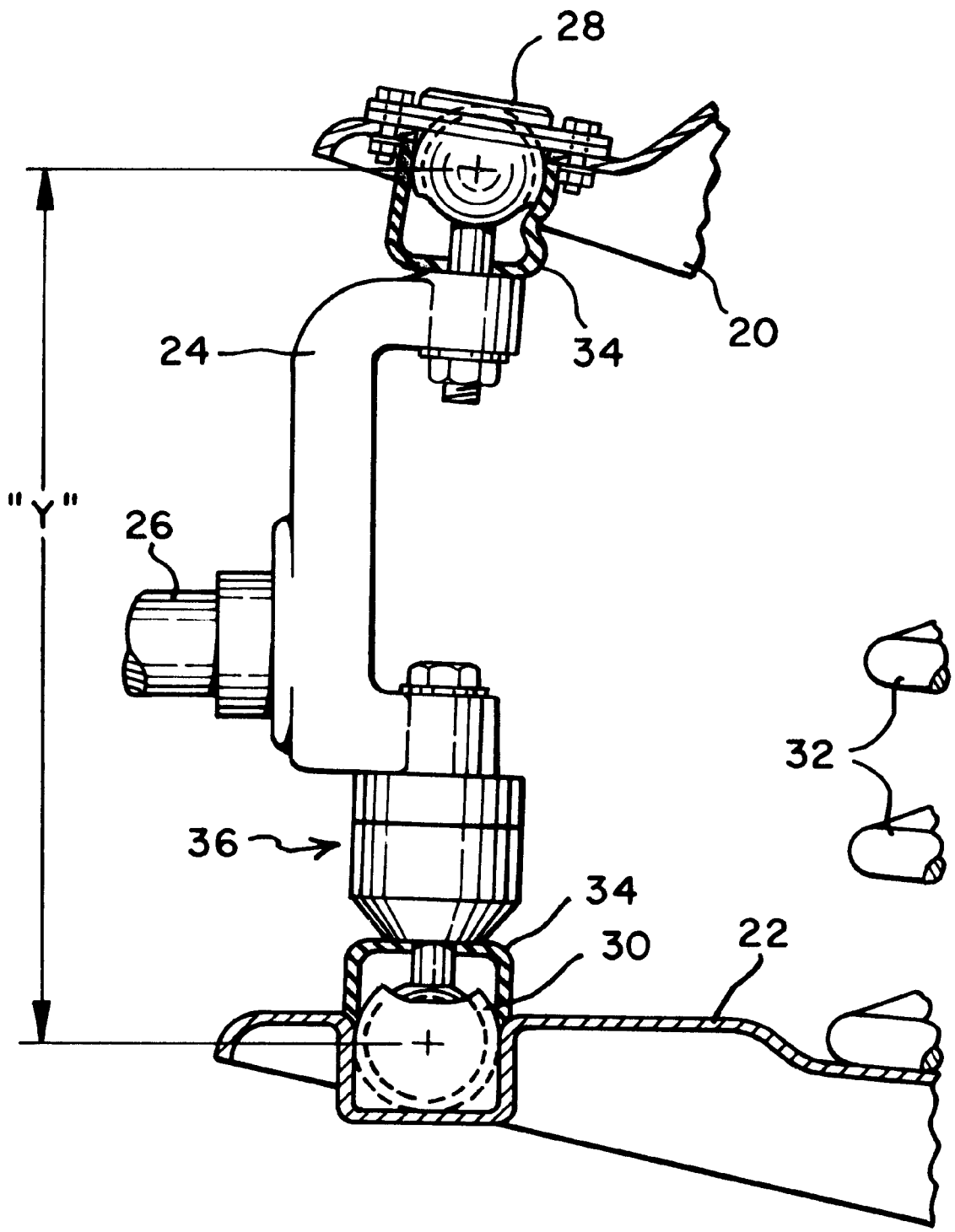

While the spindle extender has been shown and described as installed between the upper end of the spindle and the upper ball joint and this is currently preferred because it does not change the ride height of the vehicle or put increased loads on the upper control arm, the spindle extender could be mounted between the lower end of the spindle and the lower ball joint as shown in FIG. 12. As shown in FIG. 12, spacer 36 is installed between the lower end of spindle 24 and the lower ball joint 34. While the distance Y is the same as in FIG. 2, the axle 27 is moved upwardly with respect to lower control arm so that the ride height of the vehicle is lowered.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An apparatus for modifying the camber curve of double wishbone suspension systems on motor vehicles, the suspension system being of the type which includes a lower wishbone control arm mounting a lower ball joint, an upper wishbone control arm mounting an upper ball joint, and a wheel spindle having opposite mounting ends, one mounting end connected to said lower ball joint and the opposite mounting end connected to said upper ball joint so that the spindle extends between and spaces the lower and upper ball joints, said spindle having a vehicle wheel rotatably secured thereto, comprising a spacer having opposite ends, one opposite end of said spacer being configured to mate with one of said ball joints, the other opposite end of said spacer being configured to mate with one of said mounting ends of said spindle, and means for securing said spacer between a mounting end of said spindle and a ball joint, to thereby increase the distance between the lower and upper ball joints.

2. The apparatus of claim 1, wherein the spacer is to be disposed between the upper ball joint and the mounting end of the spindle normally connected to the upper ball joint.

3. The apparatus of claim 2, wherein the spacer comprises a top extender and a bottom extender, said extenders being held together by locking means, and wherein the securing means comprises upper and lower extender securing means to hold the upper extender to the upper ball joint, and the lower extender to the mounting end of the spindle, respectively.

4. The apparatus of claim 3, wherein the locking means comprises bolts.

5. The apparatus of claim 3, wherein the upper ball joint is of the type having a tapered stem with a threaded end, and the upper mounting end of the spindle is of the type having an aperture to accommodate said upper ball joint stem, wherein said upper ball joint tapered stem is to be disposed in a matching longitudinally extending tapered aperture of the upper extender, said tapered aperture including a countersink at an opposite end, and the upper extender securing means comprises a nut, disposed in said countersink, and the lower extender having a longitudinally extending threaded aperture, with the lower extender securing means comprising a bolt, to be disposed through said spindle aperture and threaded into said lower extender.

6. The apparatus of claim 5, wherein the upper extender has a laterally extending slot adapted to receive a tightening lever to restrain the upper extender from rotation during assembly of the upper ball joint stem and nut thereto.

7. The apparatus of claim 5, wherein the upper and lower extenders are generally cylindrical in shape, said upper extender having a tapered end, with a plurality of circumferentially disposed, longitudinally extending threaded apertures, said lower extender having a plurality of matching countersunk clearance apertures, said locking means comprises a plurality of bolts, the upper ball joint stem has a transverse cotter pin aperture, the nut being a castle nut, and a cotter pin to be disposed in said cotter pin aperture, and engaging said castle nut with ends bent to keep the nut from rotating loose.

8. The apparatus of claim 1, wherein the spacer is to be disposed between the lower ball joint and one of the mounting ends of the spindle.

9. A method of modifying the camber curve of double wishbone suspension systems on motor vehicles wherein the suspension system includes a lower wishbone control arm mounting a lower ball joint, an upper wishbone control arm mounting an upper ball joint, and a wheel spindle having opposite mounting ends, one mounting end connected to said lower ball joint and the opposite mounting end connected to said upper ball joint so that the spindle extends between and spaces the lower and upper ball joints, said spindle having a vehicle wheel rotatably secured thereto, comprising the steps of disconnecting a connection between a mounting end of the spindle and a ball joint, and connecting a spacer between the disconnected ball joint and disconnected mounting end of the spindle to thereby again connect the ball joint and said mounting end of said spindle with the spacer therebetween to thereby increase the distance between the lower and upper ball joints.

10. The method of claim 9, wherein the spacer is connected between the upper ball joint and the mounting end of the spindle.

11. The method of claim 9, wherein the spacer is connected between the lower ball joint and the mounting end of the spindle.

* * * * *